(12) United States Patent
Lin

(10) Patent No.: US 7,290,921 B2
(45) Date of Patent: Nov. 6, 2007

(54) LIGHT GUIDE PLATE INCLUDING SUB-SCATTERING-DOTS

(75) Inventor: Jhy-Chain Lin, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 93 days.

(21) Appl. No.: 11/021,185

(22) Filed: Dec. 23, 2004

(65) Prior Publication Data

US 2005/0190579 A1   Sep. 1, 2005

(30) Foreign Application Priority Data

Feb. 27, 2004   (TW) .............................. 93105059 A

(51) Int. Cl.
*F21V 7/04*   (2006.01)
*F21V 5/00*   (2006.01)
*F21V 5/02*   (2006.01)

(52) U.S. Cl. .................. 362/625; 362/626; 362/331; 362/339

(58) Field of Classification Search ........ 362/617–620, 362/623–626, 608–610, 330, 331, 333
See application file for complete search history.

(56) References Cited

U.S. PATENT DOCUMENTS

| | | | | |
|---|---|---|---|---|
| 3,794,829 A | * | 2/1974 | Taltavull ..................... | 362/330 |
| 6,447,136 B1 | * | 9/2002 | Liu et al. ..................... | 362/625 |
| 6,568,819 B1 | * | 5/2003 | Yamazaki et al. ........... | 362/619 |
| 6,612,722 B2 | * | 9/2003 | Ryu et al. .................... | 362/331 |
| 7,004,611 B2 | * | 2/2006 | Parker et al. ................ | 362/606 |
| 7,014,343 B2 | * | 3/2006 | Leu et al. .................... | 362/331 |
| 7,131,764 B2 | * | 11/2006 | Hsu et al. .................... | 362/623 |
| 2005/0265029 A1 | * | 12/2005 | Epstein et al. .............. | 362/339 |

FOREIGN PATENT DOCUMENTS

| | | |
|---|---|---|
| CN | 95121667.8 | 9/1997 |
| CN | 01219472.7 | 6/2002 |
| CN | 00805365.0 | 4/2004 |

* cited by examiner

*Primary Examiner*—John Anthony Ward
*Assistant Examiner*—David Makiya
(74) *Attorney, Agent, or Firm*—Morris Manning Martin LLP; Tim Tingkang Xia, Esq.

(57) ABSTRACT

A light guide plate (300) includes a light incidence surface (310) for receiving light beams, a light-emitting surface (320) for guiding light beams out of the light guide plate, and a bottom surface (330) reflecting and scattering light beams in directions toward the light-emitting surface. The bottom surface includes scattering-dots (341), and a predetermined region of the bottom surface also includes sub-scattering-dots (342). At least one sub-scattering-dot is disposed around each scattering-dot. The sub-scattering-dots are smaller than the scattering-dots. With this micro-configuration, intensities of light beams output from the light guide plate are uniform and bright.

10 Claims, 5 Drawing Sheets

LIGHT GUIDE PLATE INCLUDING SUB-SCATTERING-DOTS

BACKGROUND OF THE INVENTION

1. Field of the Invention

The present invention relates to light guide plates, and particularly to a light guide plate used for a liquid crystal display.

2. The Prior Art

In a typical liquid crystal display, a backlight module provides a surface light source for illuminating the liquid crystal display. Generally, the backlight module includes a light guide plate and a light source arranged adjacent to one side of the light guide plate. The light guide plate changes light beams received from the light source into surface light beams, and directs the surface light beams to a liquid crystal panel of the liquid crystal display.

FIG. 8 shows a conventional backlight module 100. The backlight module 100 comprises a light source 110, a light guide plate 120, a diffuser 130, and a prism sheet module 140. The light guide plate 120 includes a light incidence surface 121, a light-emitting surface 122, and a bottom surface 123.

Referring to FIG. 9, a distribution of scattering-dots 124 on the bottom surface 123 of the light guide plate 120 is shown. To improve the uniformity of the surface light beams of the backlight module 100, the scattering-dots 124 are evenly arranged on the bottom surface 123 of the light guide plate 120.

With this configuration, when light beams from the light source 110 enter the light guide plate 120 from the light incidence surface 121, the scattering-dots 124 reflect and diffract the light beams. The light beams are thus changed into uniform surface light beams, which are output from the light-emitting surface 122 of the light guide plate 120. However, in one or more predetermined regions of the light guide plate 120, especially one or more small regions, it is difficult to control and micro-adjust the configuration of the scattering-dots 124 to ensure uniformity and brightness of the output light beams.

FIG. 10 is a simplified view of a plurality of scattering-dots 230 on a bottom surface 210 of another conventional light guide plate 200. Sizes of the scattering-dots 230 progressively increase with increasing distance away from a light incidence surface 220. With this configuration, the uniformity and brightness of light beams output from a light-emitting surface (not shown) can be improved overall. However, in one or more predetermined regions of the light guide plate 200, especially one or more small regions, it is difficult to control and micro-adjust the configuration of the scattering-dots 230 to ensure uniformity and brightness of the output light beams.

A new light guide plate with a new distribution of scattering-dots on a bottom surface thereof is desired in order to overcome the above-described problems.

SUMMARY OF THE INVENTION

An object of the present invention is to provide a light guide plate which is micro-configured in one or more predetermined regions thereof to ensure that intensities of light beams output from the light guide plate are uniform and bright.

In order to achieve the object set out above, a light guide plate according to the present invention comprises a light incidence surface for receiving light beams, a light-emitting surface for guiding light beams out of the light guide plate, and a bottom surface reflecting and scattering light beams in directions toward the light-emitting surface. The bottom surface comprises a plurality of scattering-dots thereon, and a predetermined region of the bottom surface also comprises a plurality of sub-scattering-dots thereon. At least one sub-scatteriug-dot is disposed around each scattering-dot symmetrically along an imaginary ring closely surrounding each scattering-dot, and the at least one sub-scattering-dot is smaller than the scattering-dot.

The light guide plate has the following advantages. In one aspect according to the invention, by the utilization of the sub-scattering-dots with a smaller size cooperating with the scattering-dots in the predetermined region, it is easier to provide a configuration that yields high uniformity and brightness of light beams exiting the light-emitting surface. This is especially the case where appropriate micro-configuration is needed in small parts of the predetermined region. In another aspect according to the invention, the utilization of the sub-scattering-dots can compensate for micro differences in the light manipulation effects of the scattering-dots affecting the whole light-emitting surface, thereby providing improved uniformity and luminance of light beams exiting the whole light-emitting surface.

Other objects, advantages and novel features of the invention will become more apparent from the following detailed description when taken in conjunction with the accompanying drawings, in which:

DESCRIPTION OF THE PREFERRED EMBODIMENTS

Figure 1:
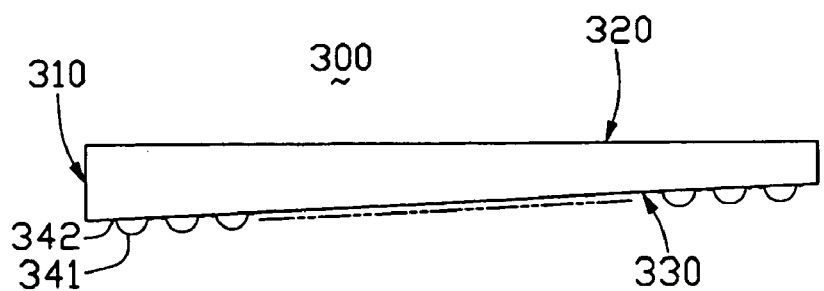
FIG. 1 is a simplified, side view of a light guide plate according to a first embodiment of the present invention.
Figure 2:
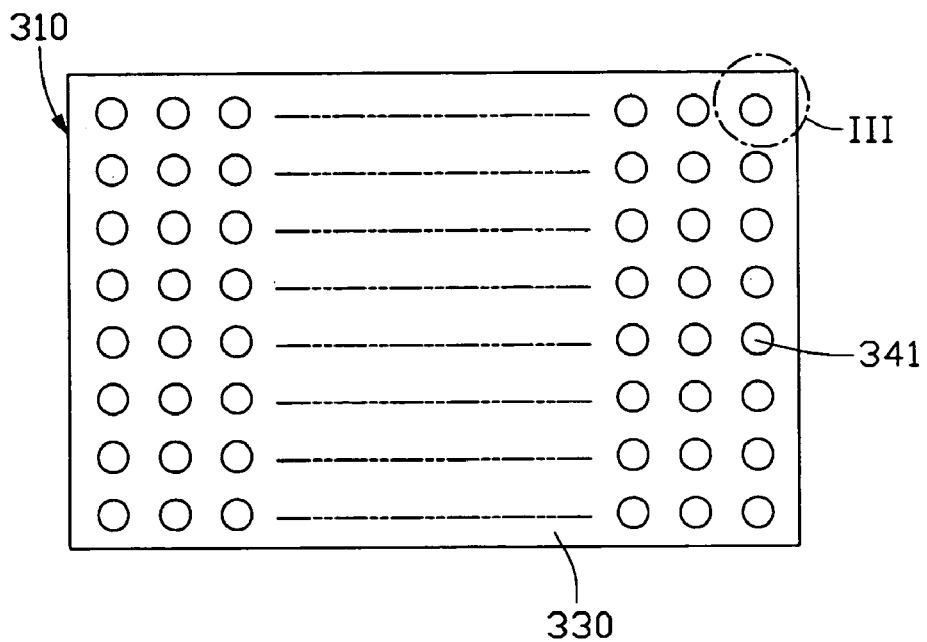
FIG. 2 is a simplified, plan view of a bottom of the light guide plate of FIG. 1, showing a distribution of scattering-dots on a bottom surface of the light guide plate.
Figure 3:
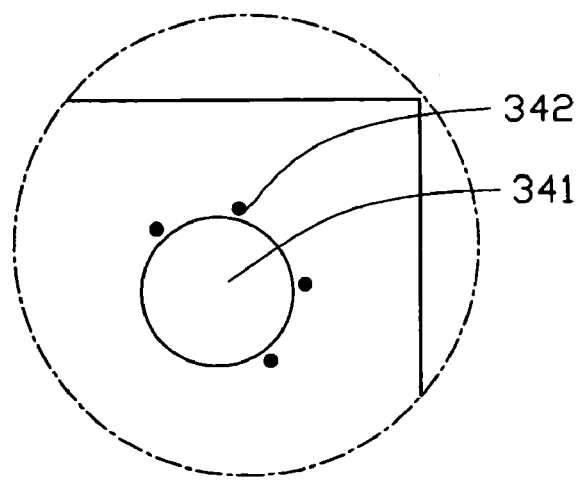
FIG. 3 is an enlarged view of a circled portion III of FIG. 2.

As shown in FIGS. 1 to 3, a plate-like light guide member 300 of the first embodiment of the present invention includes a light incidence surface 310, a light-emitting surface 320 connecting with the light incidence surface 310, and a bottom surface 330 opposite to the light-emitting surface 320.

The bottom surface 330 has a plurality of scattering-dots 341 distributed thereon as a first scattering element, for eliminating total internal reflection of light beams in the light guide plate 300. That is, light beams incident on the bottom surface 330 are reflected and scattered at the scattering-dots 341 in directions toward the light-emitting surface 320. The scattering-dots 341 have a same size and are uniformly arranged as an array on the bottom surface 330. Furthermore, in a predetermined region of the bottom surface 330, a plurality of sub-scattering-dots 342 as a second scattering element are disposed at peripheries of the scattering-dots 341. The sub-scattering-dots 342 have the same function as the scattering-dots 341. At least one sub-scattering-dot 342 is located at the periphery of each scattering-dot 341 in the predetermined region, i.e., symmetrically distributed along the ring-like predetermined region closely surrounding each scattering-dot 341. The sub-scattering-dots 342 are smaller than the scattering-dots 341. Preferably, a diameter of each sub-scattering-dot 342 is less than 10 μm, or is equal to a tenth of the size of each scattering-dot 341.

In operation, when light beams from a light source (not shown) enter the light guide plate 300 via the light incidence surface 310, the light beams are reflected and diffused by the scattering-dots 341 of the bottom surface 330 in directions toward the light-emitting surface 320. Further, in the predetermined region, certain of the light beams are reflected and diffused by the scattering-dots 341 and the sub-scattering-dots 342 of the bottom surface 330 in directions toward the light-emitting surface 320. The number and sizes of the sub-scattering-dots 342 within different parts of the predetermined region can vary, to account for differences in uniformity and intensity of the light beams reaching the different parts of the predetermined region. Thus, the light beams are uniformly transmitted out from the light-emitting surface 320 in a direction roughly perpendicular to the light-emitting surface 320.

The dots 341, 342 are formed by using the so-called LIGA process (in German: Lithographie, Galvanoformung, Abformung). LIGA includes three basic steps: lithography, electroforming, and micro molding. Firstly, a light guide plate body is formed by injection molding, the body including the light incidence surface 310, the bottom surface 330 and the light-emitting surface 320 opposite to the bottom surface 330. Secondly, a mold with a plurality of printing-dots is formed by LIGA. Finally, the light guide plate 300 with the plurality of scattering-dots 341 and sub-scattering-dots 342 is formed by hot pressing the bottom surface 330 with the mold.

Figure 4:
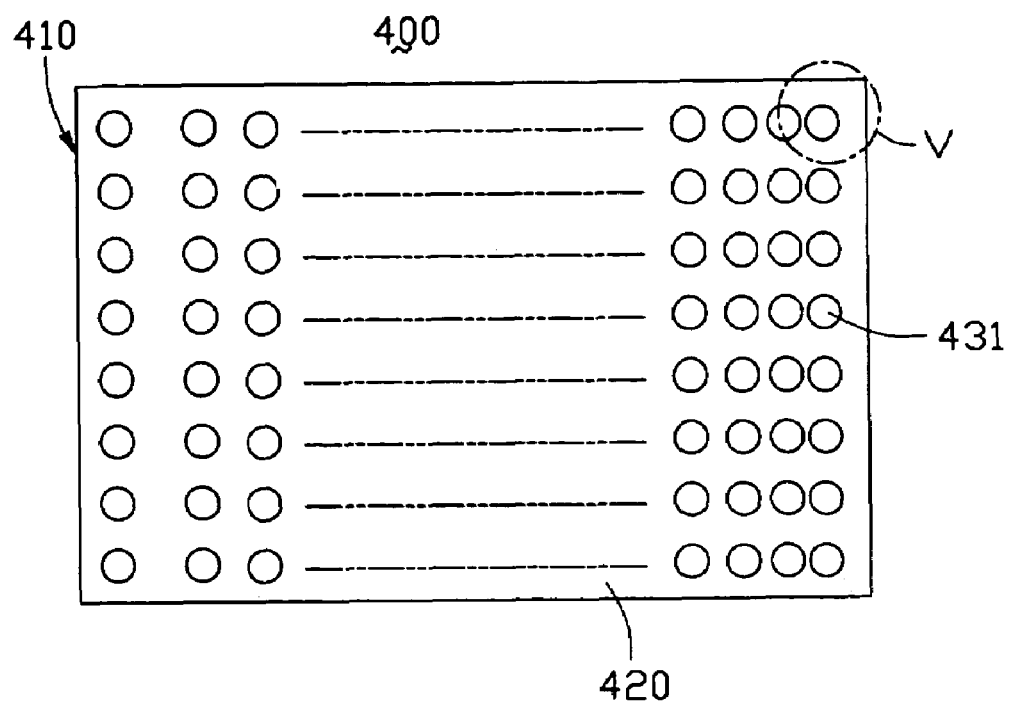
FIG. 4 is a simplified, plan view of a bottom of a light guide plate according to a second embodiment of the present invention, showing a distribution of scattering-dots on a bottom surface of the light guide plate.
Figure 5:
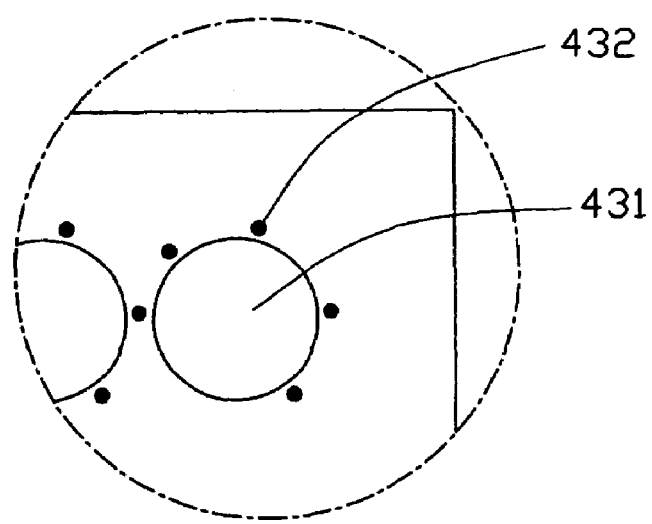
FIG. 5 is an enlarged view of a circled portion V of FIG. 4.

A light guide plate 400 according to the second embodiment of the present invention is shown in FIGS. 4 and 5. The light guide plate 400 has a structure similar to the light guide plate 300. A plurality of scattering-dots 431 and sub-scattering-dots 432 are distributed on a bottom surface 420 of the light guide plate 400. The sub-scattering-dots 432 are located at peripheries of scattering-dots 431 that are in a predetermined region of the bottom surface 420, i.e., symmetrically distributed along the ring-like predetermined region closely surrounding each scattering-dot 431. At least one sub-scattering-dot 432 is located at the periphery of each scattering-dot 431 in the predetermined region. The scattering-dots 431 have a same size. A distribution density of the scattering-dots 431 progressively increases with increasing distance away from a light incidence surface 410 of the light guide plate 400. The number and sizes of the sub-scattering-dots 432 within different parts of the predetermined region can vary, to account for differences in uniformity and intensity of the light beams reaching the different parts of the predetermined region, and/or to account for differences in the light manipulation effects of the scatteringdots 431 in the different parts of the predetermined region.

Figure 6:
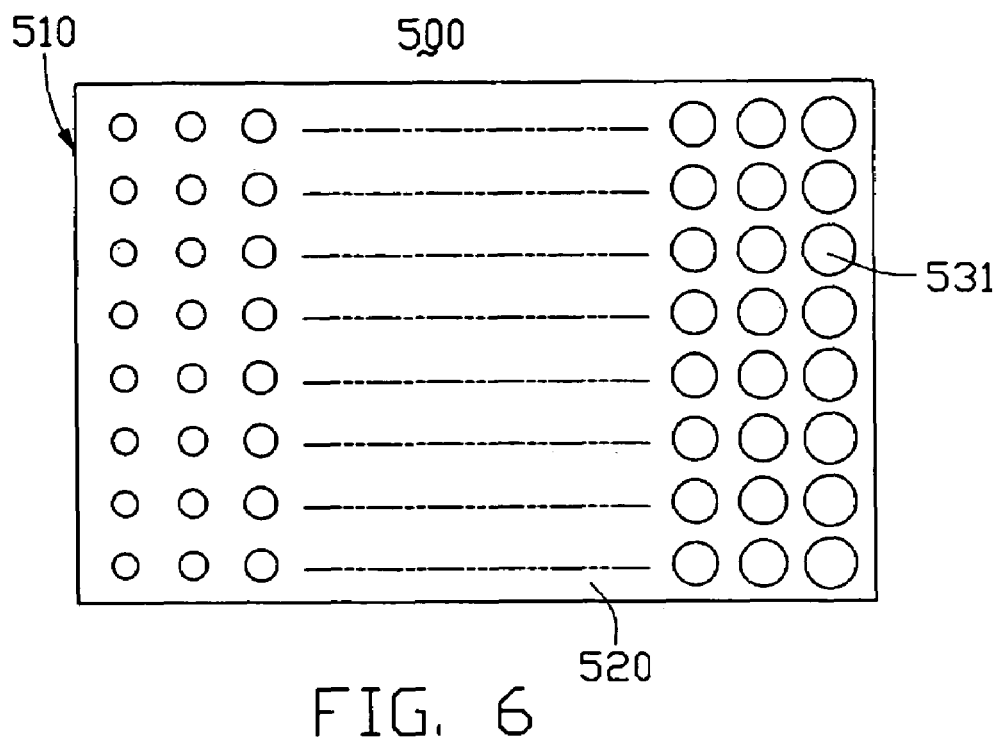
FIG. 6 is a simplified, plan view of a bottom of a light guide plate according to a third embodiment of the present invention, showing a distribution of scattering-dots on a bottom surface of the light guide plate.

FIG. 6 shows a light guide plate 500 according to the third embodiment of the present invention. The light guide plate 500 has a structure similar to the light guide plate 300. A plurality of scattering-dots 531 and sub-scattering-dots (not shown) are disposed on a bottom surface 520 of the light guide plate 500. The sub-scattering-dots are located at peripheries of scattering-dots 531 that are in a predetermined region of the bottom surface 520. At least one sub-scattering-dot is located at the periphery of each scattering-dot 531 in the predetermined region. The scattering-dots 531 are uniformly arranged on the bottom surface 520. Sizes of the scattering-dots 531 progressively increase with increasing distance away from a light incidence surface 510 of the light guide plate 500. The number and sizes of the sub-scattering-dots within different parts of the predetermined region can vary, to account for differences in uniformity and intensity of the light beams reaching the different parts of the predetermined region, and/or to account for differences in the light manipulation effects of the scattering-dots 531 in the different parts of the predetermined region.

Figure 7:
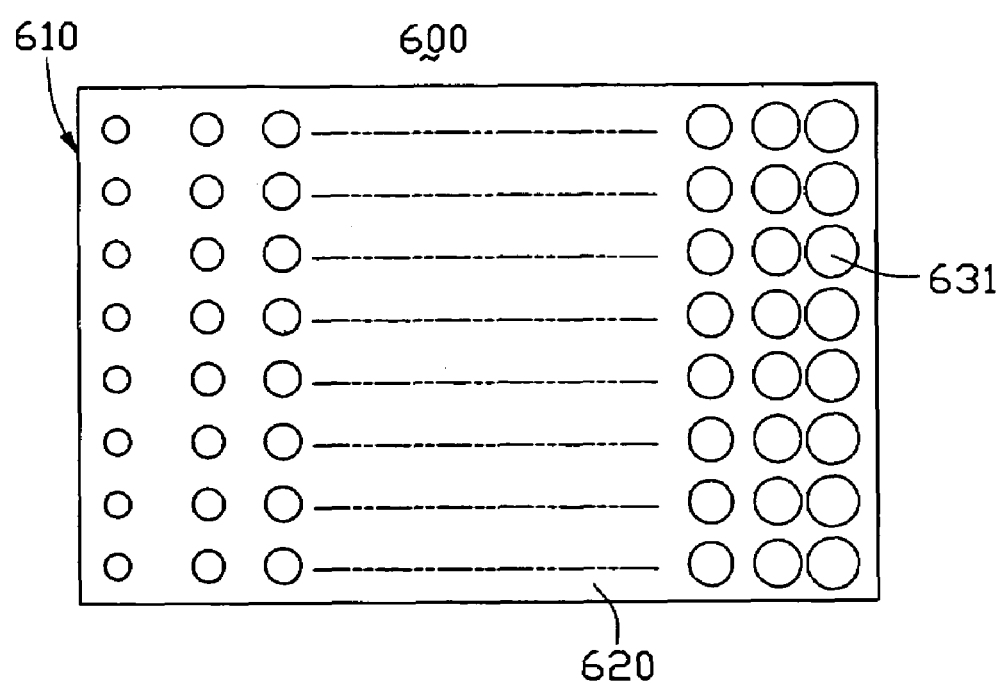
FIG. 7 is a simplified, plan view of a bottom of a light guide plate according to a fourth embodiment of the present invention, showing a distribution of scattering-dots on a bottom surface of the light guide plate.
Figure 8:
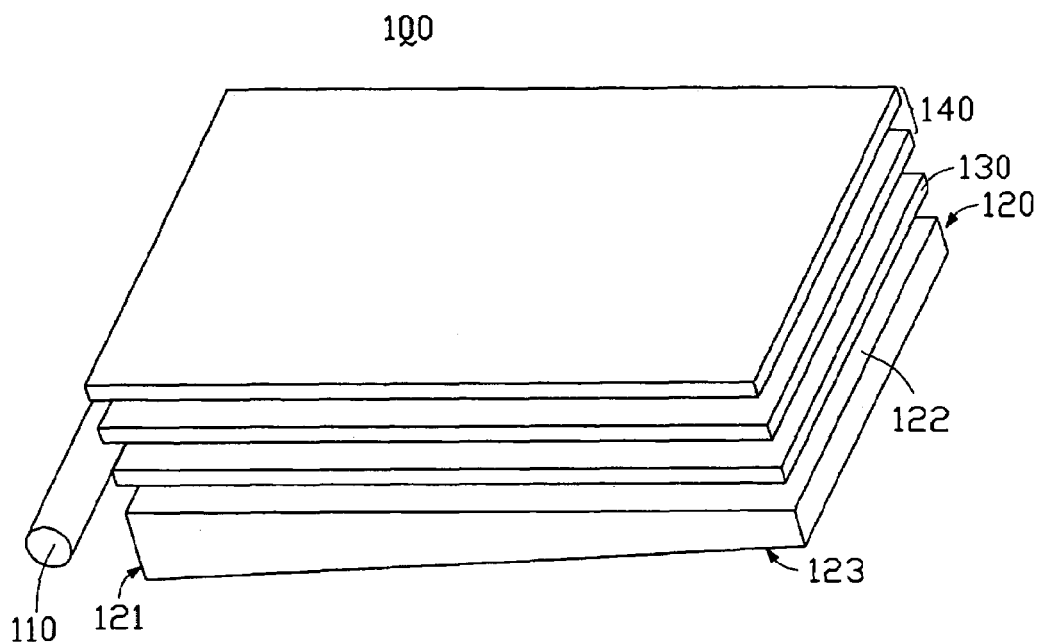
FIG. 8 is an exploded, isometric view of a conventional backlight module.
Figure 9:
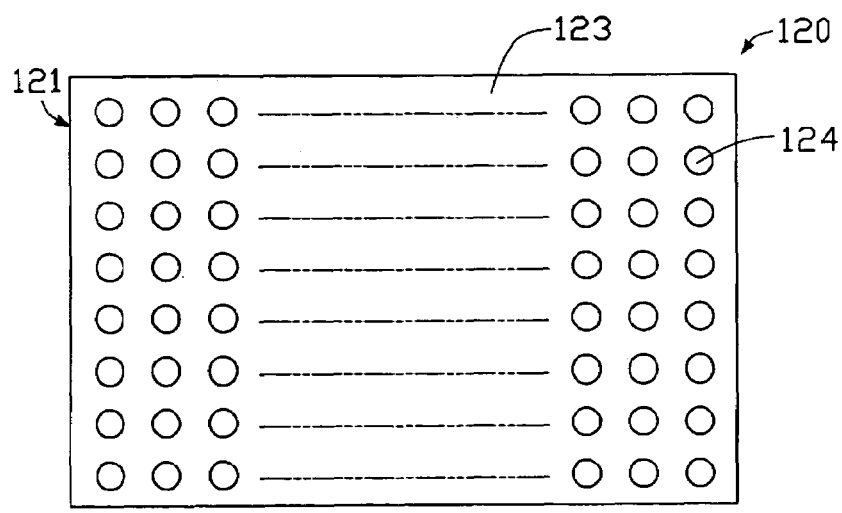
FIG. 9 is a simplified, plan view of a bottom of a light guide plate of the module of FIG. 8, showing a distribution of scattering-dots on a bottom surface of the light guide plate.
Figure 10:
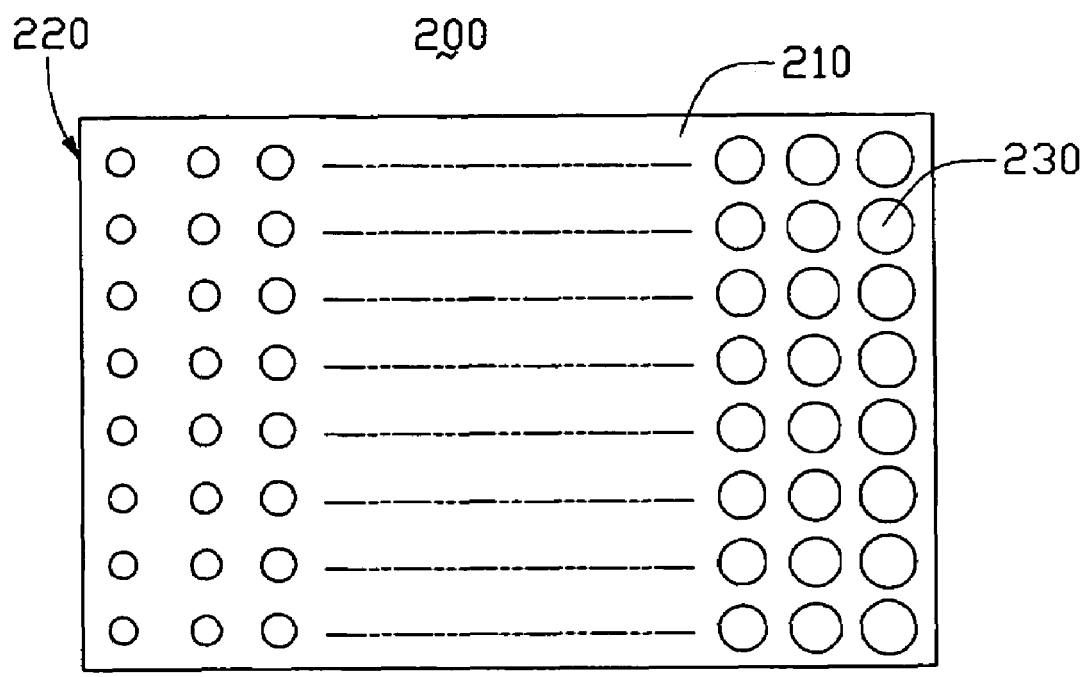
FIG. 10 is a simplified, plan view of a bottom of another conventional light guide plate, showing a distribution of scattering-dots on a bottom surface of the light guide plate.

FIG. 7 shows a light guide plate 600 according to the fourth embodiment of the present invention. In the light guide plate 600, a plurality of scattering-dots 631 and sub-scattering-dots (not shown) are distributed on a bottom surface 620 of the light guide plate 600. The sub-scattering-dots are located at peripheries of scattering-dots 631 that are in a predetermined region of the bottom surface 620. At least one sub-scattering-dot is located at the periphery of each scattering-dot 631 in the predetermined region. A distribution density and sizes of the scattering-dots 631 both progressively increase with increasing distance away from a light incident surface 610 of the light guide plate 600. The number and sizes of the sub-scattering-dots within different parts of the predetermined region can vary, to account for differences in uniformity and intensity of the light beams reaching the different parts of the predetermined region, and/or to account for differences in the light manipulation effects of the scattering-dots 631 in the different parts of the predetermined region.

In summary, the light guide plate 300 has the following advantages. In one aspect according to the present invention, by the utilization of the sub-scattering-dots 342 with a smaller size cooperating with the scattering-dots 341 in the predetermined region, it is easier to provide a configuration that yields high uniformity and brightness of light beams exiting the light-emitting surface 320. This is especially the case where appropriate micro-configuration is needed in small parts of the predetermined region. In another aspect according to the invention, the utilization of the sub-scattering-dots 342 can compensate for micro differences in the light manipulation effects of the scattering-dots 341 affecting the whole light-emitting surface 320, thereby providing improved uniformity and luminance of light beams exiting the whole light-emitting surface 320.

Furthermore, a plurality of scattering-dots and sub-scattering-dots can be arranged selectively on the light-emitting surface 310 of the light guide plate 300. In any of the above-described embodiments, the scattering-dots and the sub-scattering-dots can be hemispherical, sub-hemispherical, pyramidal, or any suitable combination of these shapes.

Further, it is to be understood that even though numerous characteristics and advantages of the present invention have been set out in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A back light module, comprising:
    a light source; and
    a light guide member adjacent to said light source, and having a light incidence surface for receiving light from said light source and a light-emitting surface for emitting said light out of said light guide member and a bottom surface wherein the incidence surface is located between the bottom surface and the light-emitting surface, said light traveling in said light guide member along a predetermined path, a plurality of first scattering elements interferingly arranged in said path of said light for scattering said light before said light emits from said light-emitting surface, and a plurality of second scattering elements arranged in a neighborhood of selective ones of said plurality of first scattering elements to surround each of said selective ones of said plurality of first scattering elements along an imaginary ring region closely around said each of said selective ones of said plurality of first scattering elements for further scattering said light; wherein
    each of said plurality of second scattering elements is sided essentially smaller than each of said plurality of first scattering elements, and
    wherein said plurality of first and second scattering elements are shaped same as each other, and have a shape comprising one of a dot, a hemisphere, a sub-hemisphere, a pyramid, or any combination thereof.

2. The back light module according to claim 1, wherein said plurality of first and second scattering elements are formed on a bottom surface of said light guide member opposing to said light-emitting surface.

3. The back light module according to claim 1, wherein each of said plurality of second scattering elements is one-tenth the size of a nearest one of said plurality of first scattering elements.

4. The back light module according to claim 1, wherein said plurality of first scattering elements are hemispherical, sub-hemispherical, pyramidal, or any combination thereof.

5. The back light module according to claim 1, wherein a distribution density and sizes of said plurality of first scattering elements both progressively increase with increasing distance away from the light incidence surface.

6. The back light module according to claim 1, wherein said plurality of second scattering elements are hemispherical, sub-hemispherical, pyramidal, or any combination thereof.

7. The back light module according to claim 2, wherein said plurality of first scattering elements are uniformly distributed on the bottom surface, and sizes of said plurality of first scattering elements progressively increase with increasing distance away from the light incidence surface.

8. The back light module according to claim 2, wherein said plurality of first scattering elements have a same size.

9. The back light module according to claim 8, wherein said plurality of first scattering elements are uniformly distributed on the bottom surface.

10. The back light module according to claim 8, wherein a distribution density of said plurality of first scattering elements progressively increases with increasing distance away from the light incidence surface.

* * * * *